United States Patent [19]

Ozawa et al.

[11] Patent Number: 4,543,610
[45] Date of Patent: Sep. 24, 1985

[54] SOLID-STATE IMAGING DEVICE INCLUDING NOISE SUBTRACTION WITH POLARITY CONTROL

[75] Inventors: Naoki Ozawa, Kokubunji; Shusaku Nagahara, Hachioji; Kenji Takahashi, Kodaira; Iwao Takemoto, Tokyo; Shigeki Nishizawa, Mobara; Masanori Sato; Satoshi Suzuki, both of Katsuta, all of Japan

[73] Assignee: Hitachi, Ltd., Tokyo, Japan

[21] Appl. No.: 518,699

[22] Filed: Jul. 29, 1983

[30] Foreign Application Priority Data

Sep. 20, 1982 [JP] Japan .................. 57-164498

[51] Int. Cl.$^4$ .................. H04N 3/14; H04N 5/21
[52] U.S. Cl. .................. 358/213; 358/167
[58] Field of Search .......... 358/213, 212, 209, 167, 358/41; 250/578; 357/24 LR; 328/162, 165, 135; 377/60, 56, 75

[56] References Cited

U.S. PATENT DOCUMENTS

| | | | |
|---|---|---|---|
| 4,067,046 | 1/1978 | Nakatani et al. | 358/213 |
| 4,079,423 | 3/1978 | Diehl | 358/213 |
| 4,240,116 | 12/1980 | Tomlinson, Jr. | 358/213 |
| 4,281,338 | 7/1981 | Takahashi et al. | 358/41 |
| 4,392,158 | 7/1983 | Aoki et al. | 358/213 |

Primary Examiner—Gene Z. Rubinson
Assistant Examiner—Stephen Brinich
Attorney, Agent, or Firm—Antonelli, Terry & Wands

[57] ABSTRACT

A solid-state imaging device comprises a number of photodiodes arrayed in horizontal rows and vertical columns, a first output circuit for sequentially reading out signal charges from those photodiodes which are arrayed on odd-numbered horizontal rows, a second output circuit for sequentially reading out signal charges from the photodiodes arrayed on the even-numbered horizontal rows, a synchronizing pulse generator for synchronizing operation of the first and second output circuits, a first subtracting circuit for determining the difference between the output signals of the first and second output circuits in odd-numbered field, and a second subtracting circuit for determining the difference between the output signals of the first and second output circuits in even-numbered field. The outputs of the first and second subtracting circuit are alternately extracted in synchronism with the synchronizing pulse produced by the synchronizing pulse generator. The solid-state imaging device is made immune to the smear phenomenon. The invention can be advantageously applied to the solid-state imaging device of CCD type as well as MOS type.

8 Claims, 7 Drawing Figures

SOLID-STATE IMAGING DEVICE INCLUDING NOISE SUBTRACTION WITH POLARITY CONTROL

The present invention relates to a solid-state imaging device. In particular, the invention concerns a solid-state imaging device which is provided with means for suppressing the phenomenon of smear.

In the imaging device for converting images into electric signals, there prevails at present a tendency for employing as a photoelectric converter element a solid-state imaging element realized through semiconductor integrated circuit technology. Owing to the use of such solid-state imaging element, the imaging device can be implemented in a much miniaturized size with lower weight and enjoy higher reliability as well as a lengthened use life when compared with the pickup-tube type imaging device.

There is shown in FIG. 1 of the accompanying drawing a circuit configuration of a hitherto known solid-state imaging element. See, for example, U.S. Pat. No. 4,392,158 dated July 5, 1983 assigned to the present assignee. Referring to this Figure, it goes without saying that only the regions of photodiodes 1 should desirably exhibit the sensitivity to light. In practice, however, peripheral parts of the photodiodes such as, for example, drain regions of MOS transistors 2 may often have the light sensitivity. The photoelectrically generated electric charge in the drain regions will then be transferred to vertical signal lines 3 independent of on/off operation of the MOS transistor. In this connection, it should be noted that all the drains of the several hundred MOS transistors arrayed in the vertical direction are connected to each of the vertical signal lines 3. Accordingly, electric charges generated photoelectrically in all the drain regions are admixedly and additively stored or accumulated on the vertical signal lines 3, resulting in that signal charge corresponding to the amount of light integrated in the vertical direction of a projected light image is stored or accumulated on each of the vertical signal lines.

The signal charge thus accumulated is outputted as superposed on normal signal charge generated by the photodiodes in every horizontal scan period. For this reason, when an image of an object to be picked up has bright portions $H_1$ and $H_2$ shown in FIG. 2a, there are produced false signals which correspond to vertically trailing portions $H_1'$ and $H_2'$, as shown in FIG. 2b.

The noise component peculiar to the solid-state imaging element is referred to as the vertical smear. See, for example, Japanese Patent Laid-Open No. 57-17276 laid open Feb. 1, 1982 (Japanese patent application No. 56-81085 dated July 20, 1979) assigned to the present assignee.

An object of the present invention is to provide a solid-state imaging device in which the disadvantages of the hitherto known solid-state imaging device are eliminated and generation of the vertical smear is suppressed.

In view of the above object, there is provided according to an aspect of the present invention a solid-state imaging device which comprises a solid-state imaging element constituted by light-sensitive picture elements arrayed in horizontal and vertical directions, first means for extracting outwardly signals derived from odd-numbered horizontal rows of the picture elements, second means for extracting outwardly signals derived from even-numbered horizontal rows of the picture elements, first control means for controlling the operation for sending the signals derived from the odd-numbered rows to the first means, second control means for controlling the operation for sending the signals derived from the even-numbered rows to the second means, a first subtracting circuit for subtracting the output quantity of the second means from that of the first means, a second subtracting circuit for subtracting the output quantity of the first means from that of the second means, and a gate circuit for changing over the output of the first subtracting circuit and the output of the second subtracting circuit with each other in response to a control signal applied to the first control means and the second control means.

The present invention will be more apparent from the following detailed description taken in conjunction with the accompanying drawings, in which.

Before entering into detailed elucidation of the present invention, the interlacing operation of a MOS type solid-state imaging device to which the invention may be applied will first be described.

Figure 1:
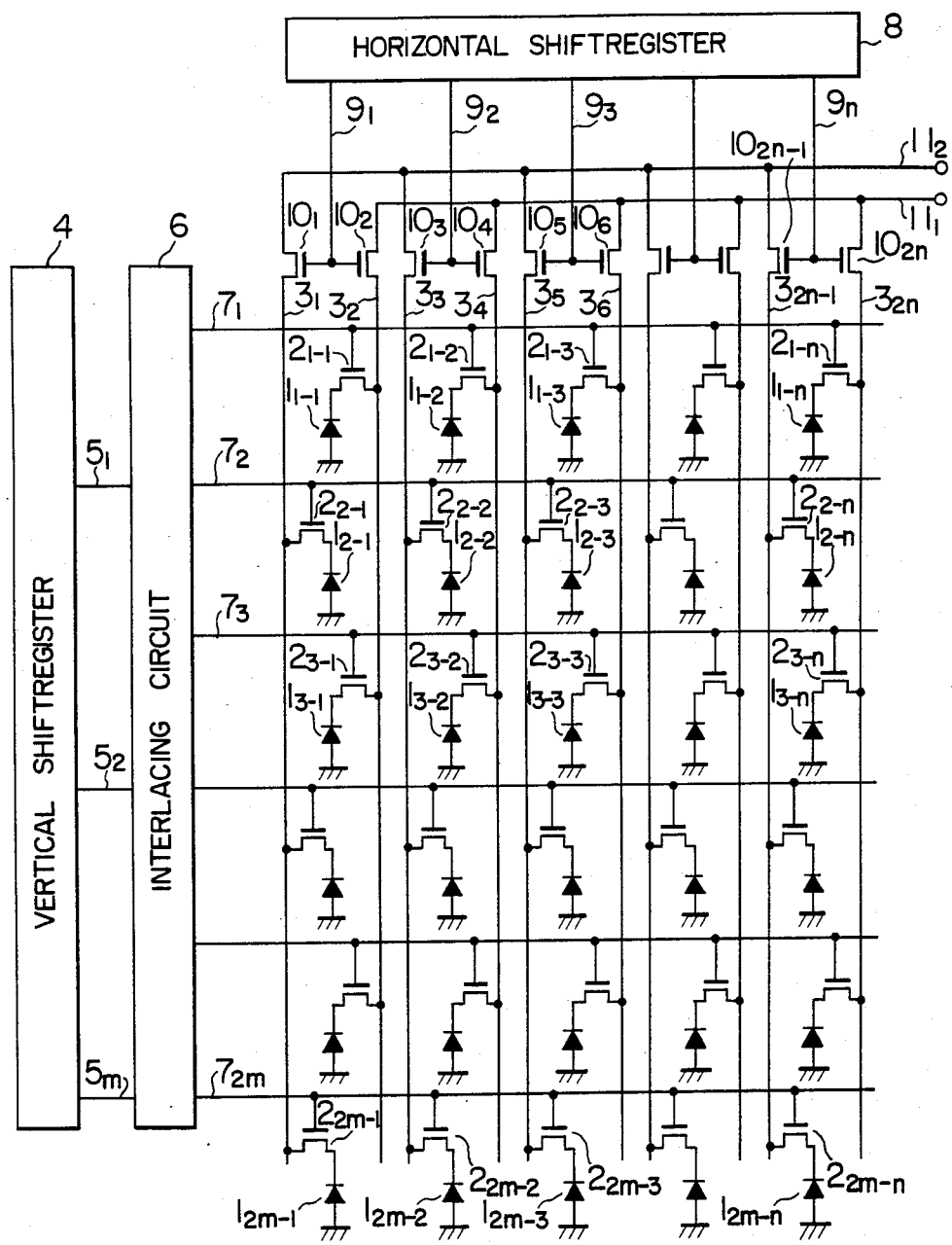
FIG. 1 is a view illustrating a structure of a MOS type solid-state imaging element.
Figure 2A:
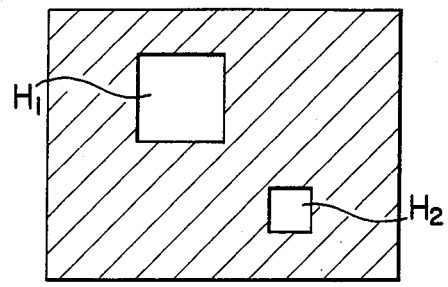
FIGS. 2a and 2b are views for illustrating generation mechanism of vertical smears.
Figure 2B:
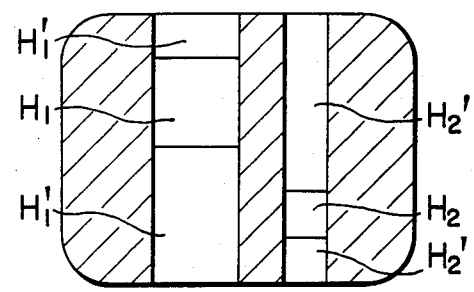

Referring to FIG. 1 which shows a MOS type solid-state imaging device, output pulses appearing sequentially on the output lines $5_1, 5_2, \ldots, 5_m$ of a vertical shift register 4 are applied to an interlacing circuit 6 to be outputted sequentially on paired output lines $7_1$ and $7_2$, $7_3$ and $7_4, \ldots$, and $7_{2m-1}$ and $7_{2m}$ simultaneously for each of the paired output lines in case of the odd-numbered field. As the consequence, during the first horizontal scan period, for example, two rows of MOS transistors $2_{1-1}, 2_{1-2}, 2_{1-3}, \ldots$, and $2_{1-n}$ and $2_{2-1}, 2_{2-2}, 2_{2-3}, \ldots$ and $2_{2-n}$ are all rendered conductive, whereby photo-signal produced by photodiodes $1_{1-1}, 1_{1-2}, 1_{1-3}, \ldots$ and $1_{1-n}$ all belonging to the first line or row are transmitted to vertical signal lines $3_2, 3_4, 3_6, \ldots$ and $2_{2n}$, respectively, while the output photo-signals of the photodiodes $1_{2-1}, 1_{2-2}, 1_{2-3}, \ldots, 1_{2-n}$ all belonging to the second line or row are transferred to vertical signal lines $3_1, 3_3, 3_5, \ldots$ and $3_{2n-1}$, respectively.

On the other hand, the output pulses appearing sequentially on output lines $9_1, 9_2, 9_3, \ldots$ and $9_n$ of a horizontal shift registers 8 during the horizontal scan period cause pairs of horizontal switch transistors $10_1$ and $10_2$, $10_3$ and $10_4, \ldots$ and $10_{2n-1}$ and $10_{2n}$ to be sequentially turned on simultaneously for each of the paired horizontal switch transistors, whereby the signals on the vertical signal lines connected, respectively, to the paired horizontal switch transistors are transmitted onto signal output lines $11_1$, and $11_2$. In this conjunction, it will be noted that the horizontal switch transistors $10_1, 10_3, 10_5, \ldots$ and $10_{2n-1}$ connected to the vertical signal lines $3_1, 3_3, 3_5, \ldots$ and $3_{2n-1}$ are connected to the signal output line $11_2$, while the horizontal switch transistors $10_2, 10_4, 10_6, \ldots$ and $10_{2n}$ connected to the vertical signal lines $3_2, 3_4, 3_6, \ldots$ and $3_{2n}$ are connected to the signal output line $11_1$.

By virtue of the arrangement mentioned above, the output signals of the photodiodes belonging to the first row are obtained from the signal output line $11_1$ simultaneously with the output signals of the photodiodes belonging to the second row which are obtained from the signal output line $11_2$.

In the case of the even-numbered field, combination of the two output lines on which pulses are produced by the interlacing circuit simultaneously in response to the pulses applied by the vertical shift register is made to differ from the combination of the output lines for the odd-numbered field described above. More specifically, when the output pulses sequentially appearing on the output lines $5_1$, $5_2$, $5_3$, ... and $5_m$ of the vertical shift register 4 are applied to the interlacing circuit 6, then the output pulses of the latter are caused to make appearance sequentially on the paired output lines $7_2$ and $7_3$, $7_4$ and $7_5$, ... and $7_{2m-2}$ and $7_{2m-1}$ simultaneously for each of the paired output lines. As the consequence, the photo-signals, for example, of the photodiodes $1_{2-1}$, $1_{2-2}$, ... and $1_{2-n}$ belonging to the second row are transferred to the vertical signal lines $3_1$, $3_3$, ... and $3_{2n-1}$, respectively, during the first horizontal scan period, while the photo-signal of the photodiodes $1_{3-1}$, $1_{3-2}$, and $1_{3-n}$ all belonging to the third row are transmitted to the vertical signal lines $3_2$, $3_4$, ... and $3_{2n}$. Thus, during the horizontal scan period of the even-numbered field, the output signals of the photodiodes belonging to the second row are obtained from the output line $11_2$, while the photo-signals of the photodiodes arrayed on the third row are obtained from the signal output line $11_1$.

In the operation described above, the signals resulted from addition of the signals obtained from the signal output lines $11_1$ and $11_2$ are such that the weight in respect to the spatial position thereof is vertically shifted by one row of the photodiodes for every field. This means that the interlacing operation is realized.

Through the interlacing operation described above, the output photo-signals of the photodiodes of all the rows are outputted from the signal output terminal for every field. Accordingly, duration of the afterimage remanent on the photodiode array upon movement of an object being picked-up corresponds to the distance for which the object moves during a single field period (1/60 seconds).

Assuming that the duration of the afterimage is tolerable within the magnitude corresponding to the distance for which the object being imaged moves during a period corresponding to a single frame (1/30 seconds) or two fields, the interlacing operation is permitted to be effected in the manner mentioned below.

Figure 3:
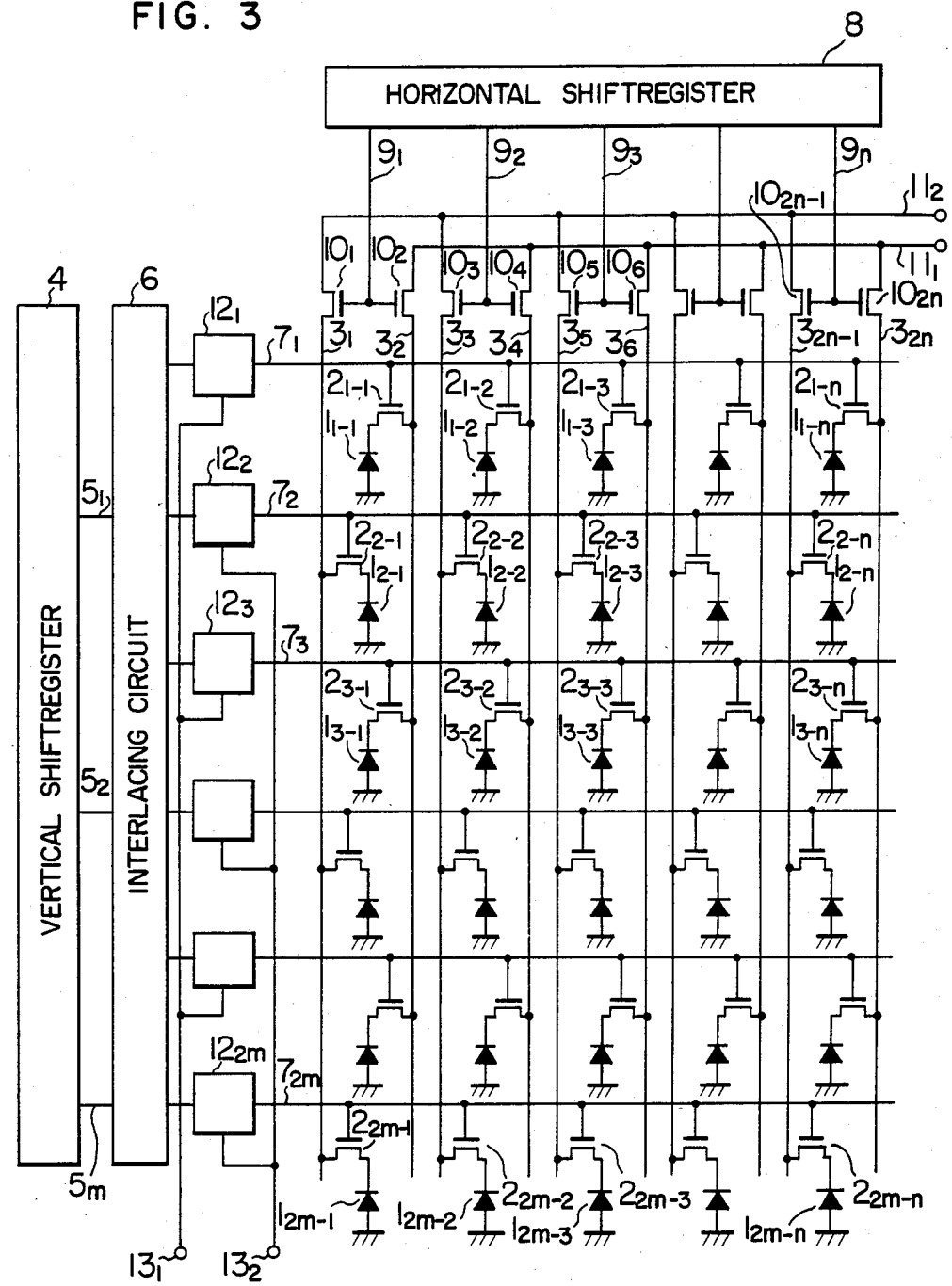
FIG. 3 is a view showing an exemplary circuit configuration of a MOS type solid-state imaging element to which the present invention can be applied.

FIG. 3 shows a circuit configuration of a MOS type solid-state imaging element in which the after-image of a duration corresponding to one frame is allowable. The MOS type solid-stage imaging element shown in FIG. 3 differs from the one shown in FIG. 1 in respect that gate circuits $12_1$, $12_2$, ... and $12_{2m}$ are additionally provided between the interlacing circuit 6 and the output lines $7_1$, $7_2$, ... and $7_m$, respectively. The gate circuits have respective control inputs connected alternately for every other one of the control terminals $13_1$ and $13_2$.

Assuming now that a turn-on signal is applied to the control terminal $13_1$ for the odd-numbered field with a turn-off signal being simultaneously applied to the control terminal $13_2$, only one (output of $12_1$) of the output pulses applied to the gate circuits $12_1$ and $12_2$ from the interlacing circuit 6 during, for example, the first horizontal scan period will be transmitted to the output line $7_1$. As the consequence, only the photo-signals of the photodiodes $1_{1-1}$, $1_{1-3}$, ... and $1_{1-m}$ arrayed in the first row are transferred to the vertical signal line $3_2$, $3_4$, ... and $3_{2m}$. On the other hand, the vertical smear signals are stored or accumulated on the vertical signal lines 3 regardless of whether the associated MOS transistors 2 are turned on or off. This results in that during each horizontal scan period of the odd-numbered field, the photo-signals $S_o$ of the photodiodes belonging to one of the odd-numbered rows are obtained from the signal output line $11_1$ together with the vertical smear signals $V_e$ stored on or held by the vertical signal lines $3_2$, $3_4$, ... and $3_{2n}$, while the smear signals $V_o$ stored on the vertical signal lines $3_1$, $3_3$, and $3_{2n-1}$ are obtained through the signal output line $11_2$.

In a similar manner, in the scanning of the even-numbered field, the turn-off signal is applied to the control terminal $13_1$ while the turn-on signal is applied to the control terminal $13_2$. On these conditions, the output pulses are transmitted only to the output line $7_2$ during, for example, the first horizontal scan period, whereby the photo-signals outputted from the photodiodes $1_{2-1}$, $1_{2-2}$, ... and $1_{2-n}$ are transferred to the vertical signal lines $3_1$, $3_3$, ... and $3_{2n-1}$. As a result, during each horizontal scan period of the even-numbered field, the photo-signals $S_e$ outputted from the photodiode belonging to the even-numbered rows are obtained from the signal output line $11_2$ together with the vertical smear signals $V_o$ stored on the vertical signal lines $3_1$, $3_3$, ... and $3_{2n-1}$, while the vertical smear signals $V_e$ stored on the vertical signal lines $3_2$, $3_4$, ... and $3_{2n}$ are obtained from the signal output line $11_1$.

Next, the present invention will be described in conjunction with the preferred embodiment thereof.

Figure 4:
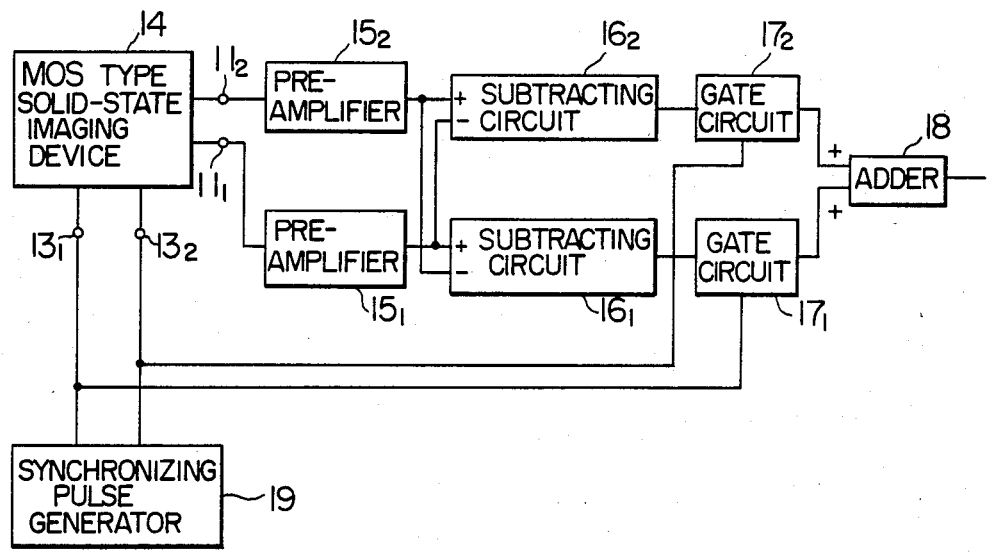
FIGS. 4 and 5 are views showing exemplary embodiments of the present invention.

Referring to FIG. 4 which shows an embodiment of the invention, the MOS type solid-state imaging element shown in FIG. 3 is generally denoted by a numeral 14.

The signal appearing at the signal output line $11_1$ of the MOS type solid-state imaging element 14 is supplied to a positive (plus) input terminal of a subtracting circuit $16_1$ and to a negative (minus) input terminal of a subtracting circuit $16_2$ through a pre-amplifier $15_1$. On the other hand, the signal appearing at the signal output line $11_2$ of the MOS type imaging element 14 is supplied to both the negative (minus) input terminal of the subtracting circuit $16_1$ and the positive (plus) input terminal of the subtracting circuit $16_2$ through a pre-amplifier $15_2$. The output signals of the subtracting circuits $16_1$ and $16_2$ are supplied to an adder circuit 18 after having been gated through gate circuits $17_1$ and $17_2$, respectively. In this connection, it should be noted that the gate circuit $17_1$ gates or passes the input signal to the output side only for the odd-numbered field in synchronism with a signal applied to the control terminal $13_1$ of the MOS type solid-state imaging element 14 from a synchronizing pulse generator 19, while the gate circuit $17_2$ transmits the input signal thereto to the output thereof only for the even-numbered field in synchronism with a signal applied to the control terminal $13_2$.

As described hereinbefore, in the scanning of the odd-numbered field, the photo-signals $S_o$ of the photodiodes belonging to the odd-numbered rows are obtained from the signal output line $11_1$ together with the vertical smear signals $V_e$ stored on the vertical signal lines $3_2$, $3_4$, ... and $3_{2n}$, while the vertical smear signals $V_o$ on the vertical signal lines $3_1$, $3_2$, ... and $3_{2n-1}$ are outputted from the signal output line $11_2$.

Considering now the fact that the vertical smears of two vertical signal lines which are located adjacent to each other in the spatial position such as the vertical signal lines $3_2$ and $3_3$, $3_4$ and $3_5$, ..., $3_{2n-2}$ and $3_{2n-1}$ the following relation applies valid:

$$V_o = V_e \quad (1)$$

Accordingly, the signal $S_{out\,1}$ applied to the adder circuit 18 from the subtracting circuit $16_1$ through the gage circuit $17_1$ for the odd-numbered field is represented as follows:

$$S_{out\,1} = (S_o - V_e) - V_o \quad (2)$$
$$= S_o \quad (3)$$

In a similar manner, for the even-numbered field, the photo-signals $S_e$ of the photodiodes belonging to the even-numbered rows are obtained from the signal output line $11_2$ together with the vertical smear signals $V_o$ of the vertical signal lines $3_1$, $3_3$, ... and $3_{2n-1}$, while the vertical smear signals $V_e$ of the vertical signal lines $3_2$, $3_4$, ... and $3_{2n}$ are obtained from the signal output line $11_1$. Accordingly, the signal $S_{out\,2}$ applied to the adder circuit $17_2$ from the subtracting circuit $16_2$ through the gate circuit $17_2$ for the even-numbered field is represented by the following expressions:

$$S_{out\,2} = (S_e + V_o) - V_e \quad (4)$$
$$= S_e \quad (5)$$

It will now be appreciated that the vertical smears produced in both the odd-numbered field and the even-numbered field are eliminated so that only the photo-signals of the photodiodes are produced by the adder circuit 18.

Figure 5:
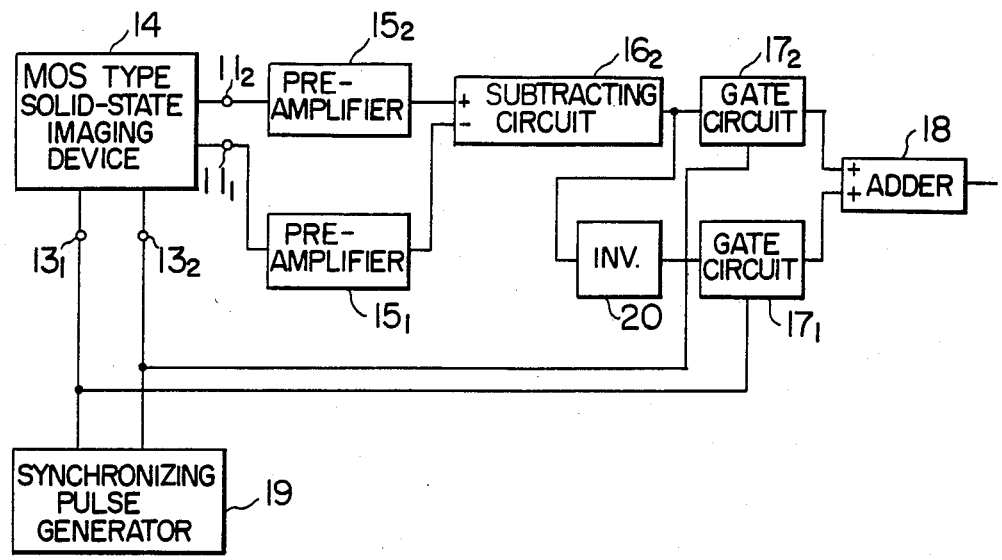

The present invention may be realized in an arrangement shown in FIG. 5 according to another embodiment of the invention. The embodiment of the invention shown in FIG. 5 differs from the one shown in FIG. 4 in respect that the output signal of the subtracting circuit $16_2$ is once applied to an inverter circuit 20 before being applied to the gate circuit $17_1$. It is obvious that the output signal of the inverter circuit 20 is equivalent to the output signal of the subtracting circuit $16_1$ of the embodiment shown in FIG. 4. Thus, in the case of the embodiment shown in FIG. 5, the subtracting circuit $16_1$ can be spared.

Further, the present invention can be applied to all the solid-state imaging elements not only to the MOS type solid-state imaging element in which the path or route along which the signals originated in the picture elements belonging to the odd-numbered rows are extracted outwardly is separated not only in the MOS type solid-state imaging element but also in the interlacing operation from the path or route along which the signals originating in the picture elements disposed on the even-numbered rows are taken out, wherein the signals transmitted along both routes are simultaneously outputted.

Figure 6:
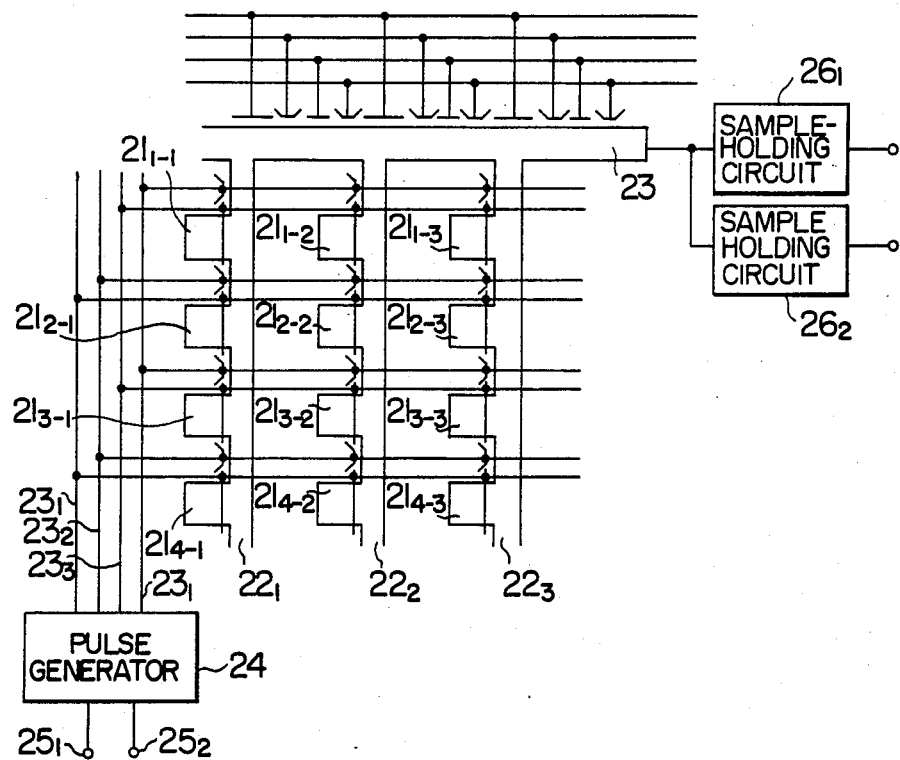
FIG. 6 is a view showing an example of the structure of an interline type CCD to which the present invention can be applied.

For example, in the case of an interline type CCD shown in FIG. 6, the photo-signals of photodiodes $21_{1-1}$, $21_{1-2}$, ..., $21_{3-1}$, $21_{3-2}$ and other belonging to the odd-numbered rows or lines are the photo-signals of photodiodes $21_{2-1}$, $21_{2-2}$, ... $21_{4-1}$, $21_{4-2}$ and others belonging to the even-numbered rows or lines can be separately transferred to the vertical CCDs $22_1$, $22_3$ and others and the horizontal CCD 23. To this end, the pulses applied to vertical transfer gates $23_1$ and $23_3$ by a pulse generator 24 are controlled through control input terminals $25_1$ and $25_2$ in such a manner that only the photo-signals of the photodiodes belonging to the odd-numbered rows are transferred to the vertical CCDs for the odd-numbered field while only the signal of the photodiodes arrayed on the even-numbered lines are transferred to the vertical CCDs for the even-numbered field. On these conditions, only the vertical smears are stored on those of the vertical CCDs to which no photo-signals of the photodiodes are transferred. Accordingly, in the even-numbered field, for example, sum signals of the photo-signals produced by the photodiodes belonging to the odd-numbered rows and the vertical smear signals are obtained alternately with the vertical smear signals. These signals can be alternately separated from each other by sample-and-hold circuits $26_1$ and $26_2$ to thereby obtain the signals similar to those produced on the output signal lines $11_1$ and $11_2$ of the MOS type solid-state imaging element shown in FIG. 3. Thus, the smears can be eliminated by resorting to the means described in conjunction with the embodiments shown in FIGS. 4 and 5.

It will now be appreciated that the present invention has now provided a solid-state imaging device in which generation of the smears is prevented by providing the subtracting circuit and which can thus assure an improvement of image quality.

We claim:
1. A solid-state imaging device comprising:
   a plurality of light-sensitive picture elements regularly disposed in an array in horizontal and vertical directions;
   a plurality of first vertical transfer means connected to those of said light-sensitive picture elements which are arrayed on odd-numbered rows and for transferring first charges in the vertical column direction;
   first signal output means connected to said plurality of first vertical transfer means and for outputting said first charges;
   a plurality of second vertical transfer means connected to those of said light-sensitive picture elements which are arrayed on even-numbered rows and for transferring second charges in the vertical direction;
   second signal output means connected to said plurality of second vertical transfer means and for outputting said second charges;
   switch means for transferring light-signal charges generated by said light-sensitive picture elements into corresponding ones of said first and said second vertical transfer means;
   vertical scan means for controlling said switch means for enabling selective reading from the picture elements for each row;
   horizontal transfer means for transferring said first and said second charges stored on said first and said second vertical transfer means into said first and said second signal output means concurrently;
   first subtraction means for subtracting the output of said second signal output means from the output of said first signal output means;
   second subtraction means for subtracting the output of said first signal output means from the output of said second signal output means; and output selection means for selecting the output of said first subtraction means when said vertical scan means controls said switch means for the odd-numbered rows and for selecting the output of said second subtraction means when said vertical scan means controls said switch means for the even-numbered rows.

2. A solid-state imaging device according to claim 1, wherein said output selection means comprises a first gate circuit for gating the output of said first subtraction means, a second gate circuit for gating the output of said second subtraction means, and an adder means for adding the outputs of said first and said second gate circuit.

3. A solid-state imaging device according to claim 2, wherein said first and said second gate circuits are gated in accordance with signals by which said vertical scan means controls said switch means for each row.

4. A solid-state imaging device according to claim 3, further comprising synchronzing pulse generating means for supplying synchronizing pulse signals to said vertical scan means and said first and second gate circuits.

5. A solid-state imaging device comprising:
- a plurality of light-sensitive picture elements disposed regularly in an array in vertical and horizontal directions;
- a plurality of first vertical transfer means connected to those of said light-sensitive picture elements which are arrayed on odd-numbered horizontal rows and for transferring first charges in the vertical column direction;
- first signal output means connected to said first vertical transfer means and for outputting said first charges;
- a plurality of second vertical transfer means connected to those of said light-sensitive picture elements which are arrayed on even-numbered horizontal rows and for transferring second charges in the vertical column direction;
- second signal output means connected to said plurality of second vertical transfer means and for outputting said second charges;
- switch means for transferring charges of light signal generated by said light-sensitive picture elements into corresponding ones of said first and said second vertical transfer means;
- vertical scan means for controlling said switch for each row for enabling selective reading from the picture elements;
- horizontal transfer means for transferring said first and said second charges stored in said first and second vertical transfer means into said first and said second signal output means concurrently;
- subtraction means for subtracting the output of said first signal output means from the output of said seacond signal output means; and
- selection means including an inverter for selecting the output of said subtraction means when said vertical scan means controls said switch means for the even-numbered rows and for selecting an inverted output of said subtraction means obtained through said inverter when said vertical scan means controls said switch means for the odd-numbered rows.

6. A solid-state imaging device according to claim 5, wherein said selection means futher comprises a first gate circuit for gating the output of said subtraction means, a second gate circuit for gating the output of said inverter, and an adder means for adding the outputs of said first and said second gate circuits.

7. A solid-state imaging device according to claim 6, wherein said first and said second gate circuits are gated in accordance with control signals by which said vertical scan means controls said switch means for each row.

8. A solid-state imaging device according to claim 3, further comprising synchronzing pulse generating means for supplying synchronzing pulse signals to said vertical scan means and said first and second gate cirzcuits.

* * * * *